(12) United States Patent
Schmidtlein et al.

(10) Patent No.: US 11,705,839 B2
(45) Date of Patent: Jul. 18, 2023

(54) CONTROL UNIT FOR OPERATING AN ELECTRICAL MACHINE, ELECTRICAL MACHINE, AND METHOD

(71) Applicant: Robert Bosch GmbH, Stuttgart (DE)

(72) Inventors: Andreas Schmidtlein, Tamm (DE); Christoph Emde, Leingarten (DE)

(73) Assignee: ROBERT BOSCH GMBH, Stuttgart (DE)

(*) Notice: Subject to any disclaimer, the term of this patent is extended or adjusted under 35 U.S.C. 154(b) by 0 days.

(21) Appl. No.: 17/630,485

(22) PCT Filed: Jul. 1, 2020

(86) PCT No.: PCT/EP2020/068508
§ 371 (c)(1),
(2) Date: Jan. 26, 2022

(87) PCT Pub. No.: WO2021/032349
PCT Pub. Date: Feb. 25, 2021

(65) Prior Publication Data
US 2022/0255478 A1  Aug. 11, 2022

(30) Foreign Application Priority Data

Aug. 21, 2019  (DE) ...................... 10 2019 212 493.3

(51) Int. Cl.
*H02P 21/09* (2016.01)
(52) U.S. Cl.
CPC .................... *H02P 21/09* (2016.02)
(58) Field of Classification Search
CPC .. H02P 21/09; H02P 6/06; H02P 6/153; H02P 27/045; H02P 27/048; G05B 19/0426; G05B 19/414

(Continued)

(56) References Cited

U.S. PATENT DOCUMENTS 7,256,563 B2 *  8/2007  Kuehner ................ H02P 21/22
  318/432

FOREIGN PATENT DOCUMENTS

DE           19949804 A1     5/2000
DE         102010034940 A1   4/2011
DE         102010039689 A1   3/2012

OTHER PUBLICATIONS

International Search Report for PCT/EP2020/068508 dated Aug. 31, 2020.

* cited by examiner

*Primary Examiner* — David Luo
(74) *Attorney, Agent, or Firm* — Norton Rose Fulbright US LLP; Gerard Messina

(57) ABSTRACT

A control unit for operating an electrical machine which includes a rotor, a stator, and power electronics. The power electronics have a plurality of switching elements, by which the phases of the stator winding are connected/connectible electrically to an electrical energy store. The control unit includes first and second processing units and is configured to determine control signals for controlling the switching elements, using the processing units. The first processing unit is configured to determine a magnitude of a setpoint voltage vector for the phases based on a setpoint rotational speed of the rotor and an actual rotational speed of the rotor. The second processing unit is connected to the first processing unit so as to be able to communicate with it, and being configured to determine the control signals as a function of the magnitude of the setpoint voltage vector and an actual angle of rotation of the rotor.

11 Claims, 2 Drawing Sheets

(58) Field of Classification Search
USPC .............................. 318/400.02, 400.01, 700
See application file for complete search history.

CONTROL UNIT FOR OPERATING AN ELECTRICAL MACHINE, ELECTRICAL MACHINE, AND METHOD

The present invention relates to a control unit for operating an electrical machine; the machine including a rotor, a stator and power electronics; where the rotor is mounted in a rotatably fixed manner on a shaft rotationally mounted in a housing, the stator is attached to the housing and includes a stator winding having at least three phases, the power electronics having a plurality of switching elements, by which the phases are connected/connectible electrically to an electrical energy store; and the control unit includes a first processing unit and a second processing unit and is configured to determine, with the aid of the processing units, control signals for controlling the switching elements.

The present invention also relates to an electrical machine having such a control unit.

In addition, the present invention relates to a method for operating an electrical machine with the aid of such a control unit.

BACKGROUND INFORMATION

An electrical machine includes, generally, a rotor and a stator. In this context, the rotor is mounted in a rotatably fixed manner on a shaft, which is rotationally mounted in a housing. The stator is attached to the housing, so that the rotor and the stator may rotate relative to each other. The stator mostly includes a stator winding having at least three phases. In this context, the phases are distributed about the rotor in such a manner, that the rotor may be driven and/or rotated by supplying sufficient power to the phases. In order to ensure a sufficient supply of power to the phases, power electronics including a plurality of switching elements are provided. Using the power electronics, that is, the switching elements, the phases are connected electrically to an electrical energy store or disconnected electrically from the energy store.

Control units for operating electrical machines are conventional in the related art; the control units including a first processing unit and a second processing unit; with the aid of the processing units, the control units being configured to determine control signals for controlling the switching elements. In this context, in accordance with conventional control units, the first processing unit is usually configured to determine setpoint phase voltages for the individual phases as a function of a setpoint rotational speed of the rotor, an actual rotational speed of the rotor, and an actual angle of rotation of the rotor. The second processing unit is then configured to determine the control signals for controlling the switching elements, as a function of the determined setpoint phase voltages. By controlling the switching elements as a function of the control signals, the desired setpoint phase voltages are then applied to the phases. To this end, for example, the switching elements of the power electronics are switched in a pulse-width-modulated manner.

SUMMARY

An advantage of the control unit of the present invention is that a computing power, which must be held in reserve in the first processing unit in order to determine the control signals, is reduced in comparison with conventional control units. In accordance with an example embodiment of the present invention, the first processing unit is configured to determine a magnitude of a setpoint voltage vector for the phases as a function of the setpoint rotational speed of the rotor and the actual rotational speed of the rotor; the second processing unit being configured to determine the control signals as a function of the magnitude of the setpoint voltage vector and the actual rotational speed of the rotor. To this end, according to the present invention, the second processing unit is connected to the first processing unit so as to be able to communicate with it, which means that the first processing unit is able to provide the second processing unit the magnitude of the setpoint voltage vector. In this context, the setpoint rotational speed is to be understood as a specified rotational speed, which is intended to be attained by controlling the switching elements as a function of the control signals. The setpoint voltage vector is a voltage vector, which corresponds to the setpoint phase voltages. For example, the setpoint phase voltages are described by the setpoint voltage vector in coordinates rotating along with the rotor, or in coordinates fixed to the stator. In this context, only the magnitude of the setpoint voltage vector is determined by the first processing unit. The second processing unit is preferably configured to ascertain an orientation of the setpoint voltage vector and/or the individual setpoint phase voltages. In this context, the control signals are preferably determined in such a manner, that in response to activating the power electronics as a function of the control signals, in each instance, an actual electrical phase voltage having a sinusoidal form is applied to each of the phases.

According to a preferred specific embodiment of the present invention, the control unit takes the form of a microcontroller. Thus, the control unit is an electrical component, namely, a microcontroller, which includes both the first processing unit and the second processing unit. In this context, the processing units are situated, in particular, on the same circuit board of the microcontroller. The construction of the control unit as a microcontroller allows the control unit to be formed in a space-saving manner.

In accordance with an example embodiment of the present invention, the first processing unit is preferably a main processing unit of the microcontroller. Since the first processing unit is the main processing unit, only a reduced computing power of the main processing unit of the microcontroller is needed for determining the control signals. Thus, the main processing unit still has sufficient computing power for other arithmetic operations to be carried out by the main processing unit.

In accordance with an example embodiment of the present invention, the second processing unit is preferably a secondary processing unit of the microcontroller. Such secondary processing units are, as a rule, already present in microcontrollers in the form of peripheral units. Consequently, it is not necessary to provide an additional processing unit otherwise not present, in order to determine the control signals. The secondary processing unit is preferably a timer of the microcontroller. The timer has a particularly short cycle time, so that temporally consecutive control signals having short time intervals between the control signals may be determined. This allows the electrical machine to be controlled precisely with the aid of the control unit.

According to a preferred specific embodiment of the present invention, the first processing unit has a first cycle time, and the second processing unit has a second cycle time; the second cycle time being shorter than the first cycle time. Particularly short time intervals between the control signals are advantageous in the determination of the temporally consecutive control signals. Such short time intervals are not necessary in the determination of temporally consecutive magnitudes of the setpoint voltage vector. Consequently, it is particularly advantageous to provide the second processing unit with the shorter, second cycle time and the first processing unit with the longer, first cycle time. In particular, the first processing unit constitutes a slow, first controller, that is, speed controller, and the second processing unit constitutes a second controller that is rapid in comparison with the first controller. The first processing unit has, for example, a cycle time of approximately 1 ms. The second processing unit has, for example, a cycle time of approximately 50 μs.

According to a preferred specific embodiment of the present invention, the control unit includes a device; the second processing unit being configured to ascertain the actual angle of rotation of the rotor as a function of data received, with the aid of the device. Since the actual angle of rotation is needed by the second processing unit for determining the control signals, the second processing unit is particularly suited for ascertaining the angle of rotation due to, in particular, the short cycle time of the second processing unit. In particular, the device is connected/connectible to an angle-of-rotation sensor of the electrical machine so as to be able to communicate with it, which means that data acquired by the angle-of-rotation sensor may be made available to the device.

According to a preferred specific embodiment of the present invention, the first processing unit is configured to determine at least one permissible, maximum phase current and to specify the determined, maximum phase current to the second processing unit; the second processing unit being configured to determine the control signals as a function of the maximum phase current. In this context, the maximum phase current is to be understood as a maximum permissible value of the electric current flowing through the phases. A particularly smooth characteristic of the actual rotational speed of the rotor is attained by specifying the maximum phase current.

According to a preferred specific embodiment of the present invention, the first processing unit is configured to determine at least one setpoint commutation angle and to specify the determined, setpoint commutation angle to the second processing unit; the second processing unit being configured to determine the control signals as a function of the setpoint commutation angle. In this context, the setpoint commutation angle is to be understood as an angle, which is specified in order to bring about precommutation of the phases. The desired precommutation, that is, the setpoint commutation angle, is specified, as a rule, as a function of rotational speed. Since the setpoint rotational speed and the actual rotational speed are already known to the first processing unit for determining the magnitude of the setpoint voltage vector, the first processing unit is particularly suited for determining the setpoint commutation angle.

The electrical machine of the present invention includes a rotor, a stator and power electronics; the rotor being mounted in a rotatably fixed manner on a shaft rotationally mounted in a housing; the stator being attached to the housing and including a stator winding having at least three phases; and the power electronics having a plurality of switching elements, by which the phases are connected/connectible electrically to an electrical energy store; and the electrical machine includes the control unit of the present invention. The advantages already mentioned above also follow from this. Further, preferred features and combinations of features are derived from the aforementioned, as well as from the disclosure herein.

According to a preferred specific embodiment of the present invention, the machine includes an angle-of-rotation sensor for monitoring the actual angle of rotation of the rotor. The angle-of-rotation sensor preferably includes a measured-value transmitter, in particular, magnetic field generator, rotating along with the rotor, and a receiver, in particular, magnetic-field-sensitive element, fixed to the housing.

The method of an example embodiment of the present invention for operating an electrical machine, which includes a rotor, a stator, power electronics, and a control unit; where the rotor is mounted in a rotatably fixed manner on a shaft rotationally mounted in a housing, the stator is attached to the housing and includes a stator winding having at least three phases, the power electronics include a plurality of switching elements, control signals for controlling the switching elements are determined by the control unit, and the switching elements are controlled as a function of the control signals in such a manner, that the phases are alternatively connected electrically to an electrical energy store or disconnected electrically from the electrical energy store by the switching elements; includes that a magnitude of a setpoint voltage vector for the phases is determined by a first processing unit of the control unit as a function of a setpoint rotational speed of the rotor and an actual rotational speed of the rotor and as a function of the magnitude of the setpoint voltage vector and an actual angle of rotation of the rotor, and the control signals are determined by a second processing unit of the control unit connected to the first processing unit so as to be able to communicate with it.

Below, the present invention is explained in greater detail in light of the figures.

DETAILED DESCRIPTION OF EXAMPLE EMBODIMENTS

Figure 1:
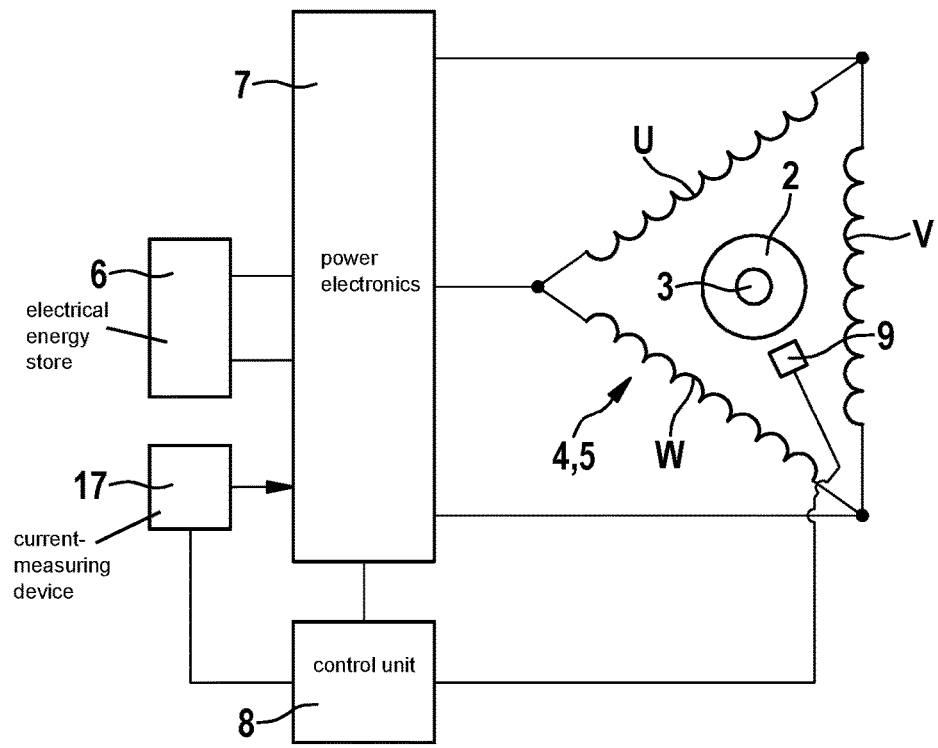
FIG. 1 shows an electrical machine having a control unit, in accordance with an example embodiment of the present invention.

FIG. 1 shows a schematic representation of an electrical machine 1. The machine 1 at hand is an electrically commutated machine 1. Machine 1 includes a rotor 2, which is presently a permanent magnet. Rotor 2 is mounted on a rotor shaft 3, which is rotationally mounted in an unshown housing of machine 1. Machine 1 also includes a stator 4 having a stator winding 5. According to the exemplary embodiment shown in FIG. 1, stator winding 5 includes three phases U, V, and W. Phases U, V, and W are positioned so as to be distributed about rotor 2 in such a manner, that rotor 2 may be driven and/or rotated by supplying power to phases U, V, and W in a suitable manner.

Machine 1 is assigned an electrical energy store 6. Energy store 6 is connected/connectible to phases U, V, W electrically with the aid of power electronics 7 of machine 1. To this end, power electronics 7 includes, for example, a number of half-bridges corresponding to the number of phases U, V and W; each of the half-bridges having two semiconductor switches, and each of phases U, V and W being connected/connectible to energy store 6 by, in each instance, a different half-bridge.

Machine 1 also includes an angle-of-rotation sensor 9 for monitoring an actual angle of rotation $\varphi_{Actual}$ of rotor 2. Angle-of-rotation sensor 9 includes, for example, a magnetic field generator as a measured-value transmitter and a magnetic-field-sensitive element as a receiver.

Electrical machine 1 also includes a current-measuring device 17, which is configured to measure actual electrical phase currents $I_{Sum}$ flowing through phases U, V and W. Current-measuring device 17 is presently connected to power electronics 7 electrically and configured to measure actual phase currents $I_{Sum}$ in the region of power electronics 7.

Machine 1 further includes a control unit 8, which is configured to determine control signals for controlling the switching elements of power electronics 7, and to control power electronics 7 as a function of the control signals. Control unit 8 is connected to angle-of-rotation sensor 9 so as to be able to communicate with it, which means that data acquired by angle-of-rotation sensor 9 may be made available to control unit 8 for determining the control signals. Control unit 8 is also connected to current-measuring device 17 so as to be able to communicate with it, which means that measured, actual phase currents $I_{Sum}$ may also be made available to control unit 8.

Figure 2:
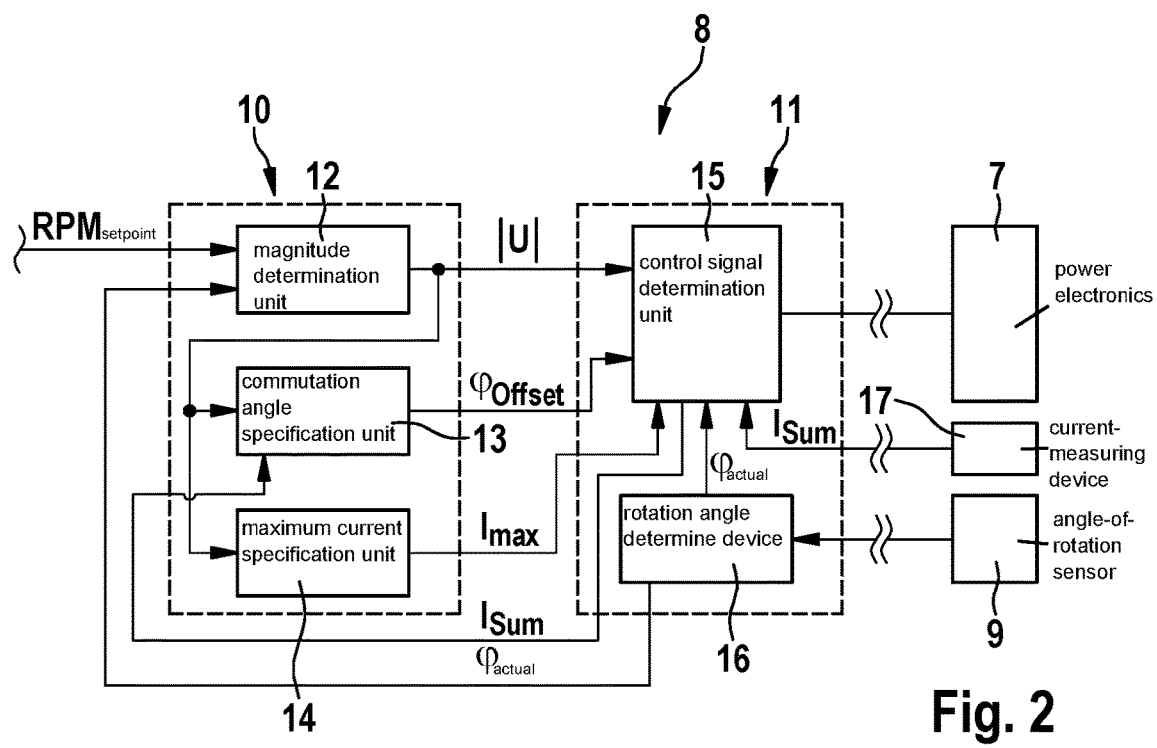
FIG. 2 shows a schematic, detailed view of the control unit, in accordance with an example embodiment of the present invention.

FIG. 2 shows a schematic, detailed view of control unit 8. Control unit 8 is a microcontroller 8. Microcontroller 8 includes a first processing unit 10, which is a main processing unit 10 of microcontroller 8, as well as a second processing unit 11, which is a secondary processing unit 11, that is, a timer 11, of microcontroller 8. In this instance, processing units 10 and 11 differ with regard to their cycle times. First processing unit 10 has a first cycle time, which is longer than a second cycle time of second processing unit 11.

In this context, first processing unit 10 is configured to determine a magnitude |U| of a setpoint voltage vector for phases U, V, and W as a function of a setpoint rotational speed $RPM_{Setpoint}$ of rotor 2 and an actual rotational speed of rotor 2. Second processing unit 11 is connected to first processing unit 10 so as to be able to communicate with it, and is configured to determine the control signals as a function of determined magnitude |U| of the setpoint voltage vector and actual angle of rotation $\varphi_{Actual}$ of rotor 2.

To this end, first processing unit 10 includes a magnitude determination unit 12, a commutation angle specification unit 13, and a maximum current specification unit 14. Second processing unit 11 includes a control signal determination unit 15 and a device 16, which is a rotor angle determination unit 16.

With the aid of rotor angle determination unit 16, control unit 8 is connected to angle-of-rotation sensor 9 so as to be able to communicate with it. Rotor angle determination unit 16 is configured to ascertain actual angle of rotation $\varphi_{Actual}$ of rotor 2 as a function of data acquired by angle-of-rotation sensor 9. Rotor angle determination unit 16 is also connected to control signal determination unit 15 and magnitude determination unit 12 so as to be able to communicate with them, in order to supply ascertained, actual angle of rotation $\varphi_{Actual}$ to these units 15 and 12.

Control unit 8 is connected to current-measuring device 17 with the aid of control signal determination unit 15 so as to be able to communicate with it, which means that the actual phase currents $I_{Sum}$ measured by current-measuring device 17 may be provided to control signal determination unit 15.

Magnitude determination unit 12 is configured to ascertain the actual rotational speed of rotor 2 as a function of actual angle of rotation $\varphi_{Actual}$, that is, as a function of a characteristic of actual angle of rotation $\varphi_{Actual}$. In addition, magnitude determination unit 12 is configured to receive setpoint rotational speed $RPM_{Setpoint}$ of rotor 2. To this end, magnitude determination unit 12 is connected to a further control unit not shown, so as to be able to communicate with it. Magnitude determination unit 12 is configured to determine magnitude |U| of the setpoint voltage vector as a function of setpoint rotational speed $RPM_{Setpoint}$ and the actual rotational speed. Magnitude determination unit 12 is connected to commutation angle specification unit 13, maximum current specification unit 14, and control signal determination unit 15 on the output side so as to be able to communicate with them, in order to make determined magnitude |U| available to these units 13, 14 and 15.

Commutation angle specification unit 13 is connected to control signal determination unit 15 so as to be able to communicate with it, so that actual phase currents $I_{Sum}$ may be provided to commutation angle specification unit 13 by control signal determination unit 15. Commutation angle specification unit 13 is configured to ascertain a setpoint commutation angle $\varphi_{Offset}$ as a function of received magnitude |U| and received, actual phase currents $I_{Sum}$, and to supply setpoint commutation angle $\varphi_{Offset}$ to control signal determination unit 15.

Maximum current specification unit 14 is configured to determine a permissible, maximum electrical phase current $I_{Max}$ as a function of received magnitude |U| and to make permissible, maximum phase current $I_{Max}$ available to control signal determination unit 15.

Finally, control signal determination unit 15 is configured to determine the control signals for the switching elements of power electronics 7 as a function of magnitude |U|, setpoint commutation angle $\varphi_{Offset}$, permissible maximum phase current $I_{Max}$, actual angle of rotation $\varphi_{Actual}$, and actual phase current $I_{Sum}$.

Figure 3:
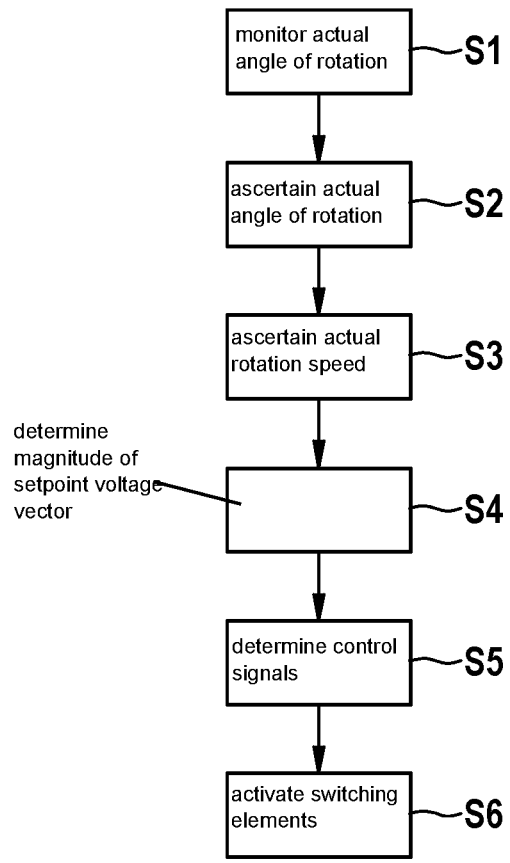
FIG. 3 shows a method for operating an electrical machine, in accordance with an example embodiment of the present invention.

In the following, with reference to FIG. 3, an advantageous method for operating electrical machine 1 with the aid of control unit 8 is described in light of a flow chart.

In a first step S1, angle-of-rotation sensor 9 monitors actual angle of rotation $\varphi_{Actual}$ of rotor 2.

In a second step S2, second processing unit 11 ascertains actual angle of rotation $\varphi_{Actual}$ of rotor 2 as a function of the data acquired by angle-of-rotation sensor 9. In step S2, ascertained actual angle of rotation $\varphi_{Actual}$ is also made available to first processing unit 10.

In a third step S3, first processing unit 10 ascertains the actual rotational speed of rotor 2 as a function of actual angle of rotation $\varphi_{Actual}$. As an alternative to that, step S3 is preferably omitted. In this case, the actual rotational speed is preferably already ascertained by second processing unit 11 in step S2, and the actual rotational speed ascertained by second processing unit 11 is supplied to first processing unit 10.

In a step S4, first processing unit 10 determines magnitude |U| of the setpoint voltage vector as a function of setpoint rotational speed $RPM_{Setpoint}$ of rotor 2 and the actual rotational speed of rotor 2. In step S4, determined magnitude |U| is made available to second processing unit 11, as well.

In a step S5, second processing unit 11 determines the control signals for controlling the switching elements of power electronics 7, as a function of magnitude |U| and actual angle of rotation $\varphi_{Actual}$.

Finally, in a step S6, the switching elements of power electronics 7 are activated as a function of the determined control signals, so that phases U, V and W are connected electrically to electrical energy store 6 or disconnected electrically from electrical energy store 6 by the switching elements.

Steps S1 through S6 are preferably executed consecutively. This produces advantageous control of the supply of power to phases U, V and W by control unit 8. Since first processing unit 10 has the longer cycle time in comparison with second processing unit 11, a time interval between magnitudes |U| of the setpoint voltage vector determined temporally directly consecutively is greater than a time interval between control signals for power electronics 7 determined temporally directly consecutively.

What is claimed is:

1. A control unit for operating an electrical machine, the machine including a rotor, a stator, and power electronics, the rotor is mounted in a rotatably fixed manner on a shaft rotationally mounted in a housing, the stator is attached to the housing and includes a stator winding having at least three phases, the power electronics have a plurality of switching elements, by which the phases are connectible electrically to an electrical energy store, the control unit comprising:
    a first processing unit and a second processing unit, the control unit being configured to determine control signals for controlling the switching elements, with the aid of the first processing unit and the second processing units;
    wherein the first processing unit is configured to determine a magnitude of a setpoint voltage vector for the phases as a function of a setpoint rotational speed of the rotor and an actual rotational speed of the rotor, the second processing unit being connected to the first processing unit so as to be able to communicate with the first processing unit, and is configured to determine the control signals as a function of the magnitude of the setpoint voltage vector and an actual angle of rotation of the rotor.

2. The control unit as recited in claim 1, wherein the control unit is a microcontroller.

3. The control unit as recited in claim 2, wherein the first processing unit is a main processing unit of the microcontroller.

4. The control unit as recited in claim 2, wherein the second processing unit is a secondary processing unit of the microcontroller, the second processing unit being a timer of the microcontroller.

5. The control unit as recited in claim 1, wherein the first processing unit has a first cycle time, and the second processing unit has a second cycle time, the second cycle time being shorter than the first cycle time.

6. The control unit as recited in claim 1, wherein the control unit is connectable to an angle-of-rotation sensor of the electrical machine so as to be able to communicate with the angle-of-rotation sensor, wherein, with the aid of the angle-of-rotation sensor, the second processing unit being configured to ascertain the actual angle of rotation as a function of data received from the angle-of-rotation sensor.

7. The control unit as recited in claim 1, wherein the first processing unit is configured to determine at least one permissible, maximum phase current and to specify the determined, maximum phase current to the second processing unit, and the second processing unit is configured to determine the control signals as a function of the determined maximum phase current.

8. The control unit as recited in claim 1, wherein the first processing unit is configured to determine at least one setpoint commutation angle and to specify the determined setpoint commutation angle to the second processing unit, and the second processing unit is configured to determine the control signals as a function of the setpoint commutation angle.

9. An electrical machine, comprising:
    a rotor;
    a stator;
    power electronics, wherein the rotor is mounted in a rotatably fixed manner on a shaft rotationally mounted in a housing, the stator being attached to the housing and including a stator winding having at least three phases, and the power electronics having a plurality of switching elements, by which the phases are connectible electrically to an electrical energy store; and
    a control unit including:
        a first processing unit and a second processing unit, the control unit being configured to determine control signals for controlling the switching elements, with the aid of the first processing unit and the second processing units;
        wherein the first processing unit is configured to determine a magnitude of a setpoint voltage vector for the phases as a function of a setpoint rotational speed of the rotor and an actual rotational speed of the rotor, the second processing unit being connected to the first processing unit so as to be able to communicate with the first processing unit, and is configured to determine the control signals as a function of the magnitude of the setpoint voltage vector and an actual angle of rotation of the rotor.

10. The electrical machine as recited in claim 9, further comprising:
    an angle-of-rotation sensor configured to monitor the actual angle of rotation of the rotor.

11. A method for operating an electrical machine, which includes a rotor, a stator, power electronics, and a control unit, the rotor being mounted in a rotatably fixed manner on a shaft rotationally mounted in a housing, the stator being attached to the housing and including a stator winding having at least three phases, the power electronics including a plurality of switching elements, the method comprising the following steps:
    determining, by the control unit, control signals for controlling the switching elements, the switching elements being controlled as a function of the control signals in such a manner, that the phases are alternatively connected electrically to an electrical energy store or disconnected electrically from the electrical energy store by the switching elements;
    wherein the determining of the control signals includes determining, by a first processing unit of the control unit, a magnitude of a setpoint voltage vector for the phases as a function of a setpoint rotational speed of the rotor and an actual rotational speed of the rotor, and as a function of the magnitude of the setpoint voltage vector and an actual angle of rotation of the rotor, determining, by a second processing unit of the control unit connected to the first processing unit, the control signals, wherein the second processing unit is connected to the first processing unit so as to be able to communicate with the first processing unit.

\* \* \* \* \*